United States Patent
Williams (10) Patent No.: US 9,325,934 B2
(45) Date of Patent: Apr. 26, 2016

(54) IMAGE PROCESSING SYSTEM AND METHOD

(71) Applicant: Sony Corporation, Tokyo (JP)

(72) Inventor: Michael John Williams, Winchester (GB)

(73) Assignee: Sony Corporation, Tokyo (JP)

( * ) Notice: Subject to any disclaimer, the term of this patent is extended or adjusted under 35 U.S.C. 154(b) by 470 days.

(21) Appl. No.: 13/684,364

(22) Filed: Nov. 23, 2012

(65) Prior Publication Data

US 2013/0141525 A1 Jun. 6, 2013

(30) Foreign Application Priority Data

Dec. 1, 2011 (GB) .................................. 1120695.0

(51) Int. Cl.
*H04N 7/00* (2011.01)
*G06T 7/00* (2006.01)
*H04N 5/232* (2006.01)
*H04N 5/247* (2006.01)
*H04N 5/262* (2006.01)

(52) U.S. Cl.
CPC .. *H04N 7/00* (2013.01); *G06T 7/00* (2013.01); *G06T 7/0028* (2013.01); *G06T 2207/10016* (2013.01); *G06T 2207/20212* (2013.01); *G06T 2207/30228* (2013.01); *H04N 5/23203* (2013.01); *H04N 5/247* (2013.01); *H04N 5/262* (2013.01)

(58) Field of Classification Search
None
See application file for complete search history.

(56) References Cited

U.S. PATENT DOCUMENTS

| 6,133,944 A | * | 10/2000 | Braun et al. | 348/39 |
| 2004/0239688 A1 | * | 12/2004 | Krajec | 345/629 |
| 2007/0064143 A1 | * | 3/2007 | Soler et al. | 348/335 |
| 2008/0002023 A1 | * | 1/2008 | Cutler | 348/36 |
| 2012/0154593 A1 | * | 6/2012 | Anderson | 348/157 |

FOREIGN PATENT DOCUMENTS

| GB | 2 452 546 A | 3/2009 |
| WO | WO 2011/022755 A1 | 3/2011 |

OTHER PUBLICATIONS

United Kingdom Search Report Issued Mar. 30, 2012, in Great Britain Patent Application No. 1120695.0, filed Dec. 1, 2011.
U.S. Appl. No. 13/684,352, filed Nov. 23, 2012, Williams.

* cited by examiner

*Primary Examiner* — Michael Teitelbaum
(74) *Attorney, Agent, or Firm* — Oblon, McClelland, Maier & Neustadt, L.L.P.

(57) ABSTRACT

An image processing system comprises a first video camera arranged to have a first width of field of view, and operable to capture a first image, a second video camera arranged to have a second width of field of view narrower than that of the first video camera, and operable to capture a second image substantially at the same time that the first camera captures the first image, and an image processing unit operable to access scene geometry for a known scene, with the first video camera and the second video camera being arranged in a pre-set positional relation to each other; the image processing unit is arranged in operation to map scene geometry onto the first image captured by the first video camera, and the image processing unit is arranged in operation to map onto the second image captured by the second video camera at least part of the scene geometry mapped onto the first image, in dependence upon the pre-set positional relation of the first and second video cameras and their respective widths of field of view.

12 Claims, 8 Drawing Sheets

IMAGE PROCESSING SYSTEM AND METHOD

BACKGROUND OF THE INVENTION

1. Field of the Invention

The present invention relates to a system and method of image processing.

2. Description of the Prior Art

Presently, TV coverage of sports and other events typically provides a combination of close-up shots of individual people and also wide-angle shots of the scene as a whole. These enable the producers of the TV coverage to convey both the detail and drama of an individual's role in the event, and also a broader context within which the individual's role takes place.

However, when providing this coverage, it can be difficult to anticipate where dramatic events that will warrant close-up analysis will occur, and similarly it can also be difficult to consistently provide broader context for closely tracked dramatic events as they unfold.

The present invention seeks to mitigate or alleviate these problems.

SUMMARY OF THE INVENTION

In a first aspect an image processing system is provided according to claim 1.

In another aspect, a method of image processing is provided according to claim 12.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

A system and method of image processing are disclosed. In the following description, a number of specific details are presented in order to provide a thorough understanding of the embodiments of the present invention. It will be apparent, however, to a person skilled in the art that these specific details need not be employed to practise the present invention. Conversely, specific details known to the person skilled in the art are omitted for the purposes of clarity where appropriate.

Figure 1A:
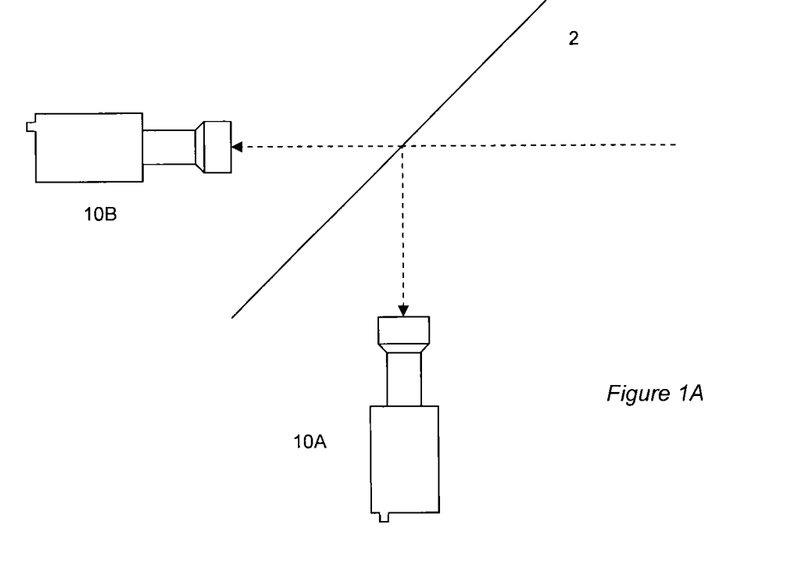
FIG. 1A is a schematic diagram of a video camera pair in a fixed physical relation to each other in accordance with an embodiment of the present invention.
Figure 1B:
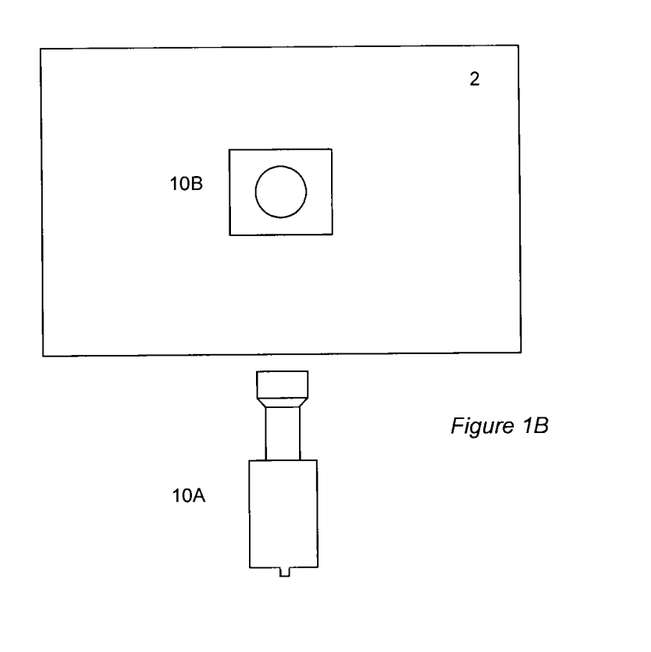
FIG. 1B is a schematic diagram of a video camera pair in a fixed physical relation to each other in accordance with an embodiment of the present invention.

Referring now to FIGS. 1A and 1B, in an embodiment of the present invention an image processing system comprises two video cameras arranged as a pair in a pre-set physical relation to each other.

The first video camera 10A is set at a first width of viewing angle (i.e. a first width of field of view). For example, the first video camera could be locked-off at a maximum viewing angle (no additional optical zoom applied) so as to capture a wide scene, such as the pitch in a soccer (or football) stadium. The first video camera can then capture video images having this wide viewing angle.

The second video camera 10B is set at a second width of viewing angle narrower than that of the first video camera (i.e. a narrower width of field of view). For example, the second video camera could be free to zoom in on individual football players, or the goal region, or the like, and consequently has a narrower field of view than the first video camera.

Both video cameras may output data indicating parameters such as zoom level and focal length to accompany each captured video frame.

The preset physical relation between the video cameras can be similar to that of a 3D camera system. Hence the video cameras may be positioned side by side on a common mounting system so that they both move together.

Referring to FIGS. 1A and 1B, however, in an embodiment of the present invention the video cameras 10A, 10B are positioned orthogonally and optically aligned with the same point on either side of a two-way mirror 2 that is positioned between them, for example equidistant and at an angle of 45 degrees to the lens plane of each camera. As a result, both cameras notionally share the same optical centreline (subject to built-in optical variability during use). Thus more generally they can be said to be positioned in an alignment without lateral optical displacement.

In other words, despite using a system similar to that of a 3D camera, the pair of cameras are not stereoscopically separated and do not generate a stereoscopic image pair. Rather, they generate a pair of images substantially sharing a centre point, with one image having a wider field of view than the other.

Figure 2:
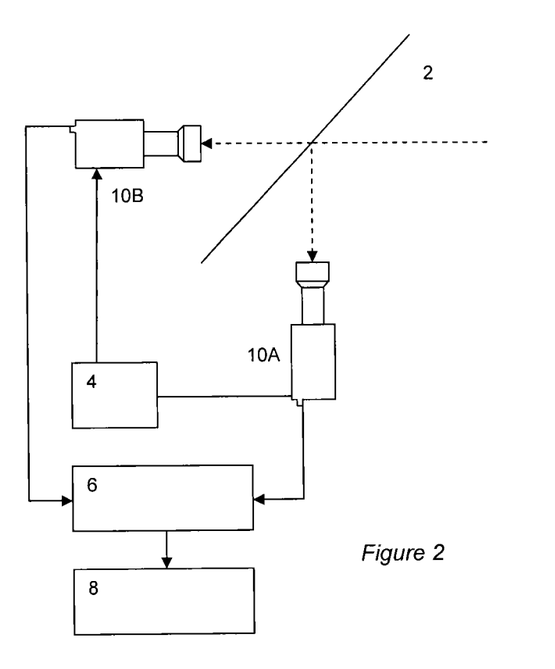
FIG. 2 is a schematic diagram of an image processing system in accordance with an embodiment of the present invention.

Referring now to FIG. 2, a reference signal source 4 is operable to transmit a reference signal for controlling the timing of video image capture by the first and second video camera 10A, 10B, so that they capture video images in synchrony. A typical reference signal source is a so-called Gen-Lock signal source known in the art.

Consequently a video capture unit 6 stores video frames generated by the pair of video cameras at substantially the same time, and may associate such video frames with a time code for the same time, hence indicating that they were generated at the same time. The video capture unit may comprise a hard disk, digital tape, optical media, solid state memory or any combination of these to store the video frames.

In an embodiment of the present invention, the image processing system also comprises an image processing unit (image processor) 8, operable to use images from the two video cameras, for example by accessing stored video frames from the capture unit, or alternatively by receiving live video frames passed through the capture unit.

The image processing unit comprises an image augmentation processor (for example a video graphics card operating under suitable software instruction), and the image augmentation processor is operable to graphically augment video images.

Thus for example it may be possible to superpose spatially relevant information on the image of a football pitch, such as distance markers or lines between players, or to tag players with names or statistics, or even add virtual pitch decoration, for example to indicate which team holds which half of the pitch, or to add a logo of their sponsors or any other type of advertising.

Figure 3A:
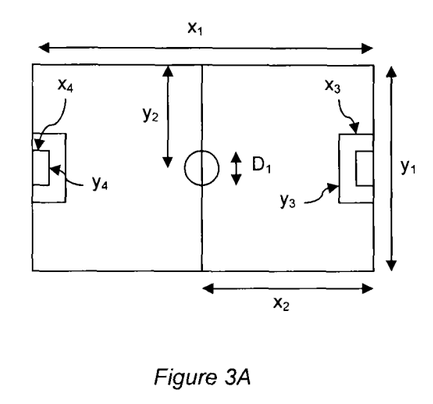
FIG. 3A is a schematic diagram of stored scene geometry in accordance with an embodiment of the present invention.
Figure 3B:
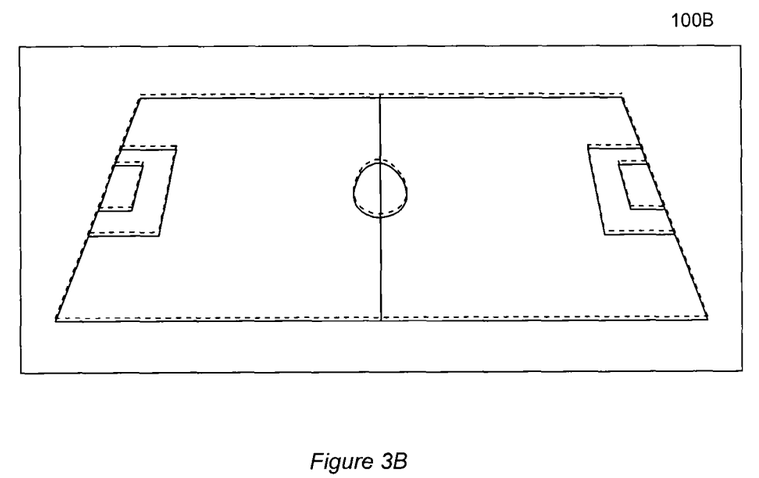
FIG. 3B is a schematic diagram of scene geometry mapped onto a scene in accordance with an embodiment of the present invention.

Referring now to FIGS. 3A and 3B, the image processing unit may be able to perform such superposition by holding scene geometry as shown in FIG. 3A corresponding to the physical scene being viewed. Thus for example it may hold data regarding the dimensions of lines and shapes marking out a football pitch, represented in FIG. 3A by the example marked dimensions $x_{1-4}$, $y_{1-4}$ and $D_1$. It will be understood that this data may similarly relate to a tennis court, basketball court, concert stage or any other fixed structural or patterned element of the scene. It will be appreciated that the number of dimensions and their relative positions required to suitably define the geometry will depend on both the complexity of the scene and also potentially upon the nature of the intended augmentation (for example, if it was intended to superpose a logo halfway between the penalty box and centre circle of a soccer pitch, then this distance may also be defined with respect to either the centre line or goal line).

The geometry itself may be represented as a parametric list or in any suitable form, and may be considered to represent a template AR marker. As such the geometry itself may be normalised, for example taking the length of the pitch $x_1$ to be a length of 1 arbitrary unit. Alternatively or in addition, the geometry may be represented by a graphical template embodying the reference geometry at a predetermined position, scale and orientation. Hence more generally, in this way the image processing unit can access scene geometry for a known scene.

In any event, the corresponding features of the scene (such as the lines on the soccer pitch in the above example) can then be treated as a (very large) AR marker and identified using known AR marker identification techniques, to determine the position of the pitch on x and y axes, its scale (i.e. its position on a z-axis), and its orientation (i.e. its rotation about the x, y and z axes) relative to the first video camera.

Typical AR marker identification techniques known in the art are based on the assumption that the candidate AR marker in the captured image (here predetermined features of the scene) is a homologue of the reference marker (here the scene geometry) that differs due to a transformation in scale, orientation and position, and seeks to estimate a mapping or transform of the reference marker that best fits the candidate marker. However, it will be appreciated that any suitable technique that identifies a mapping between stored scene geometry data and features of the captured scene are envisaged.

It will be appreciated that this transform or mapping can then be used to map the geometry onto the captured image in a manner that is consistent with the appearance of the scene in the captured image, as illustrated in FIG. 3B (in this case the mapping is fractionally offset to clearly show the captured lines on the soccer pitch as solid lines, and the transformed geometry as dashed lines).

This transformation or mapping could then be used to map graphical augmentations onto the image that are also consistent with the position and orientation of the captured image from the first video camera.

However, in an embodiment of the present image it is desired to augment the captured image from the second camera. It will be appreciated that the second camera has a narrower field of view (e.g. because it is zoomed in on an area around a particular soccer player) and hence an insufficient amount of the scene (in this example the lines of the soccer pitch) may be available to directly calculate a mapping from the stored geometry onto the image. In other words, the image from the second camera may only comprise a fragmentary part of the AR marker in the scene, which is insufficient to determine the AR marker's position and rotation with respect to the second camera.

Consequently, the image processing unit is arranged in operation to further map onto the second image captured by the second video camera at least part of the scene geometry mapped onto the first image, in dependence upon the pre-set physical relation of the first and second video cameras and their respective widths of viewing angle.

Thus for example, where the two cameras are optically aligned (i.e. notionally share the same centre point such that there is no lateral displacement or relative rotation between the images captured by the first and second camera), then the transformation or mapping made for the image from the first camera can be modified (re-mapped or re-transformed) onto the second image by changing the scale or z axis position responsive to the relative difference in zoom between the first and second cameras.

Where the cameras are side by side, the lateral displacement of the first and second images as a function of estimated distance to the scene is also incorporated into the re-mapping. Where in this case the cameras are arranged in a non-parallel manner (i.e. so that their lines of sight converge at a finite distance), then a rotational component responsive to the angle of convergence may also be included in the re-mapping.

In any event, the image augmentation processor is then operable to graphically augment the second image based upon the scene geometry as re-mapped onto the second image. Thus advantageously a graphical augmentation (such as a planar graphic texture) can be mapped appropriately onto the image from the second video camera despite that image itself not comprising enough information to determine the required mapping directly.

Whilst it was noted above that in one embodiment the two cameras notionally share the same centre point such that there is no lateral displacement (or relative rotation), in practice this may not be true for all conditions due to manufacturing tolerances in the cameras, and due to variations in image distortion that may occur at different levels of zoom, including variation in the optical centreline of the camera and hence positional variability, as a function of zoom.

To mitigate this, correction factors may be estimated in advance for the second camera for a plurality of zoom positions, and these factors may be accessed (or interpolated from accessed correction factors) as a function of the current zoom level. As noted previously, the video cameras output operational parameters with each captured frame, including an indicator of the current level of zoom/width of viewing angle.

The correction factors may then be applied during the re-mapping to correct the scene geometry for relative optical distortions between the first image and the second image arising from the difference in the width of viewing angle between the second video camera and the first video camera.

The correction factors themselves may be estimated during an earlier calibration stage, as briefly recounted here.

In brief, both cameras are positioned as they will be in use, and the first camera is centred on a calibration target object (for example a chequered ball, but any suitable object or scene feature may be used). The second camera is then set to a desired width of view (i.e. zoom setting). An image from each camera is then captured, together with lens data (such as focal length/zoom data). The image of the calibration target object in each image is then used to calculate the overall lens distortion (including possible lateral shift) apparent between the image from the first video camera and the image from the second video camera. The calculated distortion then provides the correction factors for the re-mapping process.

The correction factors for the second video camera are preferably calculated for the second video camera for at least two widths of field of view. This enables interpolation to at least a first level of accuracy at zoom levels between these two widths (for example the minimum and maximum zoom levels available in normal use of the camera). Clearly however, it will be appreciated that additional correction factors measured at different zoom levels will improve the accuracy of estimation at a given zoom level.

As noted previously, the wider field of view in images captured by the first camera can facilitate the calculation of geometry mappings that are subsequently used (via an intermediate re-mapping) for the corresponding image from the second video camera.

In a similar manner, a first image sequence from the first camera may be used to track an image feature (such as a particular player), and the estimated position of the image feature may then be similarly mapped to a corresponding image in a second image sequence from the second camera.

This has several advantages. Using the example of tracking soccer players, firstly a zoomed-in image of a soccer player is likely to be highly variable in nature as the relative position and overall shape of the player in the image may change rapidly, and also may wholly or partially leave the second image sequence on a regular basis. These are all factors that militate against conventional tracking algorithms such as a Kalman filter tracking algorithm. By contrast the player is likely to be more easily tracked as a smaller object remaining within the bounds of an image sequence of the pitch as a whole (or a larger proportion of it).

Secondly, other players may be tracked who are not currently present within the second image, so that when they even partially appear within the second image they can be identified with reference to the tracking performed with the first image.

Hence more generally, the position of a feature in the scene that is captured by the second video camera can be tracked over time with reference to images from the first video camera. Moreover, the position of a feature in the scene captured by the first video camera can be tracked over time in anticipation of that feature appearing at least partially in an image from the second video camera.

It will be appreciated that if the role of the first video camera is limited to providing wider-angle images either for intermediate geometry mapping or for feature tracking, then the first video camera may be of a lower overall quality than that of the second video camera. This quality may be in terms of one or more of the quality of optics, imaging sensor, resolution, colour gamut, internal electronics, build quality and/or overall cost, and may be generically termed as a 'machine vision' camera, as the intent is not to broadcast the captured image for user viewing.

By contrast, of course the first video camera may alternatively have substantially the same image quality as the second video camera. In this case the cameras are likely to be the same model or an equivalent model, such that images from each camera are subjectively similar (e.g. within manufacturers tolerances) for the same camera settings. Similarly, the first camera may in fact be of a higher quality to the second camera. Hence more generally the first and second video cameras may be of an equivalent broadcast quality or both meet a same minimum broadcast quality criterion.

In these circumstances it will be appreciated that it could be possible to switch from the images output by the second camera to the images output by the first camera.

Figure 4A:
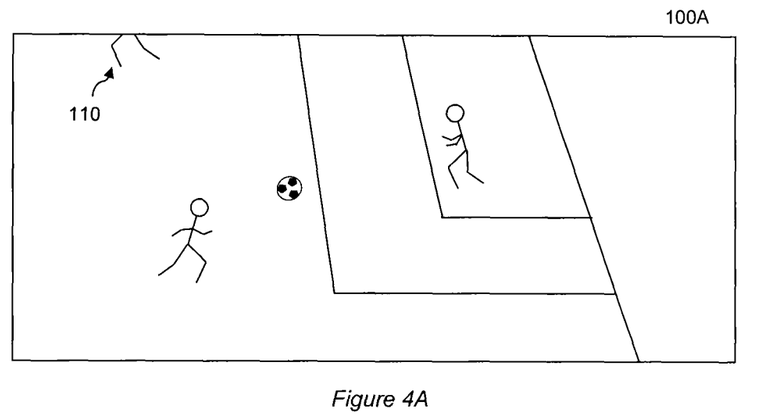
FIG. 4A is a schematic diagram of a captured video image at a narrow field of view in accordance with an embodiment of the present invention.
Figure 4B:
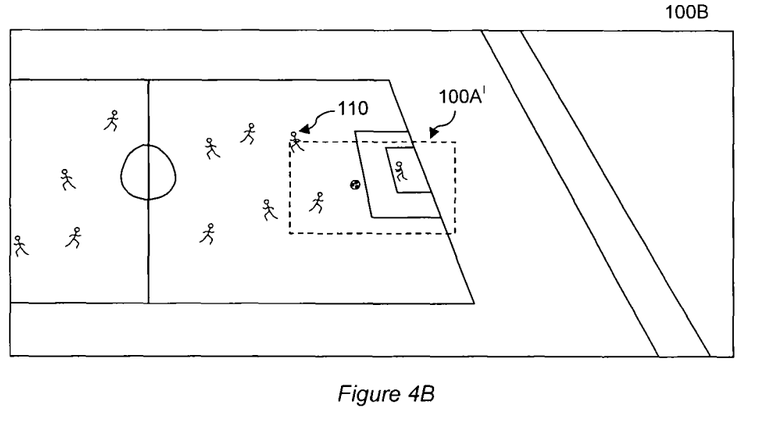
FIG. 4B is a schematic diagram of a captured video image at a wider field of view in accordance with an embodiment of the present invention.

Hence, and referring now also to FIGS. 4A, 4B, in an embodiment of the present invention the image processing unit is operable to calculate a first region of the first image (from the first, wide-angle video camera) corresponding to at least part of the second image (from the second, zoomed in video camera), and operable to generate an output image comprising a digitally zoomed second region of the first image either corresponding to or encompassing the first region. This enables a transition out from the at least part of second image into the first image.

In more detail, FIG. 4A shows an image 100A captured from the second video camera, whilst FIG. 4B shows an image 100B captured from the first video camera. As described previously, the image from the first camera can be used for example to map augmentation onto the portion of the scene captured by the second camera as seen in FIG. 4A, and similarly tracking based on the image captured from the first video camera can be used to identify players found in the image captured by the second video camera, including players only partially visible (such as for example the player 110).

Based upon the mapping determined previously (or alternatively based upon the relative zoom between the first and second video cameras, and feature alignment techniques such as cross-correlation), the region $100A^I$ of the image in the first video camera can be identified that corresponds to the image from the second video camera.

The region $100A^I$ may then be digitally zoomed into to replicate the viewpoint of the second camera, and the output of the image processing unit can switch or fade from the image from the second camera to the digitally zoomed in region of the image from the first camera.

Figure 4C:
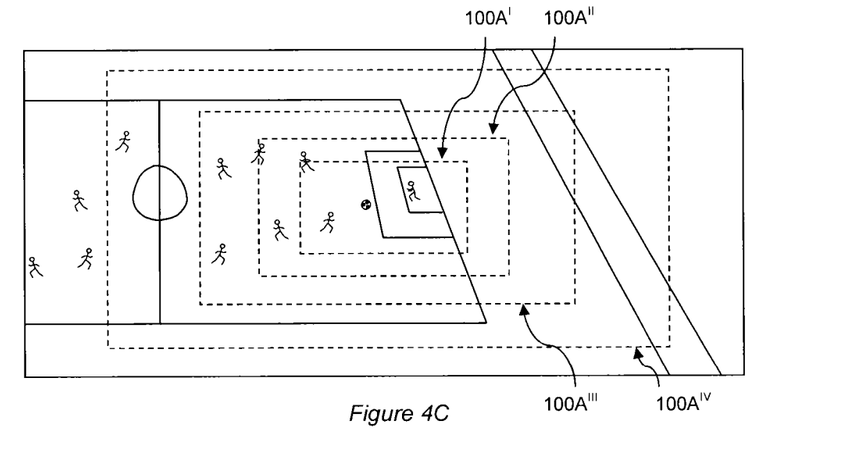
FIG. 4C is a schematic diagram of a captured video image at a wider field of view in accordance with an embodiment of the present invention.

Referring to FIG. 4C, successive captured image frames from the first camera may then be similarly digitally zoomed to a successively smaller extent ($100A^{II}$, $100A^{III}$, $100A^{IV}$), to generate an output image sequence in which the images apparently zoom out from the close-up view from the second camera to a wider angle view, such as the wide angle view of the first camera.

It will be understood that the image processing means may switch to a digitally zoomed region of an image from the first camera at a level of zoom equivalent in this example to $100A^{II}$; in other words, optionally there is no need to display the digitally zoomed version of the image area exactly equivalent to the image from the second video camera, as this is already available for use.

As noted with respect to the geometry mapping, in practice the image from the second video camera may differ from that of the first video camera by more than magnification (zoom) due to relative optical distortions. Hence optionally the correction factors described previously can be used to warp or transform the image from the first video camera according to the level of digital zoom applied to the image(s) from the first camera, to provide a smooth transition from the optical properties of the second camera inherent in the second picture and the optical properties of the first camera inherent in the first picture or picture sequence over the transition.

Figure 5:
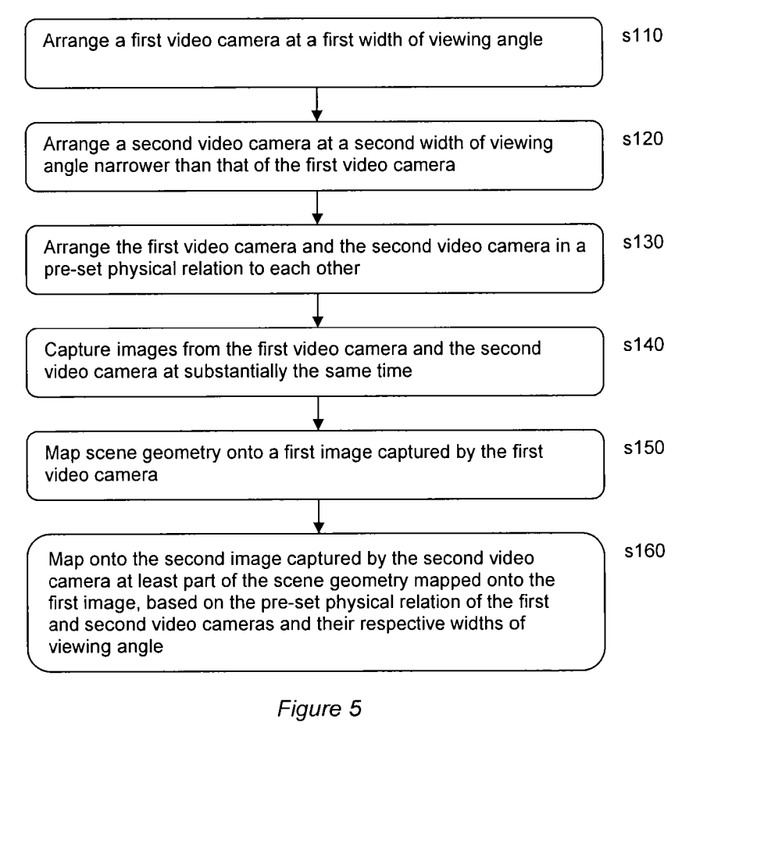
FIG. 5 is a flow chart for a method of image processing in accordance with an embodiment of the present invention.

Referring now to FIG. 5, a method of image processing comprises:

in a first step s110, arranging a first video camera to have a first width of field of view;
in a second step s120, arranging a second video camera to have a second width of field of view narrower than that of the first video camera;
in a third step s130, arranging the first video camera and the second video camera in a pre-set physical (i.e. positional) relation to each other;
in a fourth step s140, capturing a first image from the first video camera and a second image from the second video camera at substantially the same time;
in a fifth step s150, mapping scene geometry onto the first image captured by the first video camera; and
in a sixth step s160, mapping onto the second image captured by the second video camera at least part of the scene geometry mapped onto the first image, in dependence upon the pre-set positional relation of the first and second video cameras and their respective widths of field of view.

It will be apparent to a person skilled in the art that variations in the above method corresponding to operation of the various embodiments of the apparatus as described and claimed herein are considered within the scope of the present invention, including but not limited to:

graphically augmenting the second image based upon the scene geometry as mapped onto the second image; and
tracking over time the position of a feature in the scene that is captured by the second video camera with reference to images from the first video camera.

Figure 6:
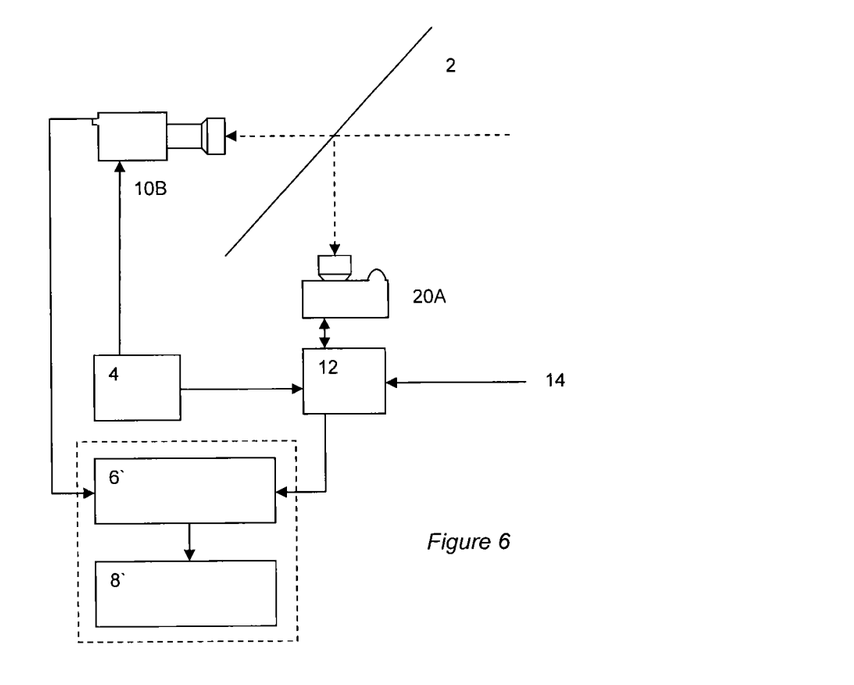
FIG. 6 is a schematic diagram of an image processing system in accordance with an embodiment of the present invention.

Referring now also to FIG. 6, in an alternative embodiment, rather than using a first video camera with a wide-angle view, a still camera 20A can be arranged at a first width of viewing angle and be operable to capture a still image. In this case, the second video camera 10B (hereafter, simply 'the video camera') will consequently have a lower resolution than the still camera. In a similar manner to the previous embodiments, typically it is also arranged at a second width of viewing angle narrower than that of the still camera, but this is not essential.

Hence the overall arrangement of the cameras is similar to that of previous embodiments, except that a still camera is used in place of the first video camera, and the still video camera will have a higher resolution than the remaining video camera. For example, a typical HD video camera operates at 1920×1080 pixels, or a resolution of approximately 2 megapixels. A good quality digital SLR still camera may capture images at a resolution of 14 megapixels, whilst a professional so-called 'medium format' digital still camera may capture images with a resolution in the order of 40 megapixels—and hence have a resolution roughly 20 times that of the video camera.

Image capture unit 6' is similar to video capture unit 6 described previously, but is operable to acquire video images from the video camera and still images from the still camera. Meanwhile image processing unit 8' is operable to process still images as well as video images. Their functionality (or additional functionality, if also operable to be connected to the camera arrangements described previously herein) is described later. Collectively they may be referred to as an image capture and processing unit. Finally, a reference signal source (or 'GenLock') 4 is provided that is again similar to that previously described.

As can be seen in FIG. 6, the still camera and video camera are arranged in a pair having a pre-set physical relation to each other, in a similar manner to the two video cameras described previously.

In addition, a shutter release control unit 12 is provided for initiating capture of a still image by the still camera. The shutter release control unit controls when the camera shutter is released (i.e. when the still camera takes a photo), typically by sending an appropriate signal to the camera, either by a wired or wireless connection.

The shutter release control unit comprises an input for receiving a triggering input 14, such as a local or remote user input, a periodic (timer based) input, and/or an input from the image processing unit 8', for example in response to a threshold change between successive images indicative of a sudden event in the scene. Other suitable inputs or events warranting a still photograph will be apparent to the skilled person.

The shutter release control unit also comprises an input for receiving a reference signal (GenLock signal) from the reference signal source.

In response to receiving a triggering input, the shutter release control unit is operable to release a shutter of the lens responsive to the next reference signal from the reference signal source. In other words, once instructed to take a still photograph, the shutter release control unit synchronises the shutter release with receipt of the next reference signal, and hence also synchronises the shutter release with the capture of the next video image by the video camera, as the video camera is also synchronised to the reference signals. Optionally, if there is a different relative delay between receipt of the reference signal and the taking of a picture for one of the video camera and the still camera (e.g. in the order of a few milliseconds due to fixed mechanical or processing delays), then the other camera of the pair may be arranged to implement a suitable fixed delay to accommodate this difference and re-synchronise the captured images.

In addition to the reference signal, a time code is generated by a time code generator (not shown). The time code generator may be a separate unit, or may be incorporated for example within any one of the reference signal source 4, the image capture unit 6', or the image processing unit 8'. The time code generator will typically output a unique number for each reference signal from the reference signal generator (for example an incrementing number, or real-time value), but any suitable output scheme serving to produce a unique ID at a specific moment in time is envisaged. For example, a time code may be output in response to a request by the image capture unit 6'.

In summary therefore a video image and a still image are generated by the respective cameras in synchrony, and output to the image capture and processing unit (e.g. to the image capture unit 6'). The image capture and processing unit is then operable to associate a same time code with the still image and the video image generated responsive to the same reference signal.

The time code may be associated with the two images by inserting it in metadata that forms part of each image, or in a data field of a file wrapper used as part of storing the image.

Alternatively the time code may be stored in a look-up table in associated with further unique codes identifying the video and still images.

As described previously, the video camera can output lens data for each video frame. In a similar manner, still cameras also generally output lens data associated with a captured image. This data is also stored with the respective image.

Figure 7:
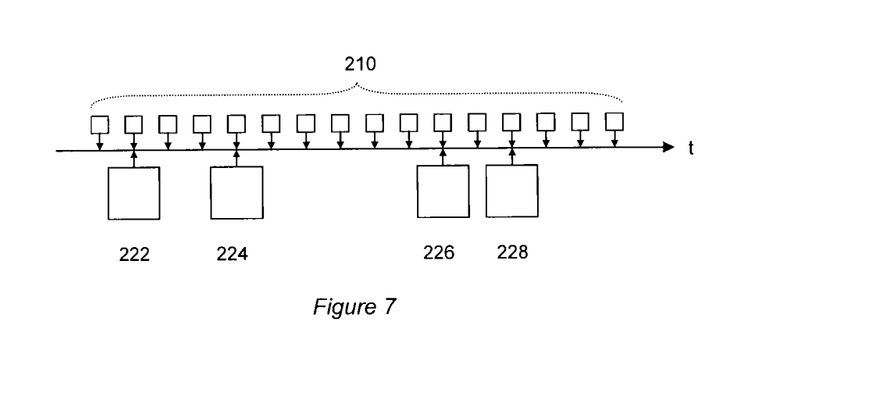
FIG. 7 is a schematic diagram of stored video and still images in accordance with an embodiment of the present invention.

Referring to FIG. 7, the result is a stored sequence of video images 210 and a stored set of still images (222, 224, 226, 228) each comprising a time code that places the image at a position in time t, where video images and still images captured in response to the same reference signal have the same time code. As will be appreciated from FIG. 7, there will typically not be a still image associated with every video image.

Referring now back to FIG. 4B, it will be appreciated that the same principles described for transitioning between images from the two video cameras may be used to identify a first region of a still image that corresponds to the video image with the same time code. That is to say, a first region of the still image corresponding to the video image can be estimated from the relative difference in width of field of view, as determined from their respective lens data, and also from the cameras' pre-set physical relation to each other, or based upon cross-correlation between the images, or a suitable combination of the two (for example using the relative zoom and any lateral offset to predict an initial search position and region size in a cross-correlation search for the best matching region in the still image).

Again as noted above, when generating the resulting digitally zoomed version of the still image, further correction factors may be taken into account for relative optical distortions between the video image and the still image, with these correction factors based upon a calibration of the video camera. As with the previous embodiments, the lens calibration data typically comprises one or more parametric descriptions of one or more optical properties of the video camera for at least two widths of field of view, to enable interpolation to different levels of zoom.

The image capture and processing unit (e.g. the image processing unit 8') is operable to implement the above approach, and to generate an output image based upon the first region of the still image.

This output image may be a digital zoom into the still image that exactly corresponds to the first region, or that frames a second region encompassing the first region, in a similar manner to that described previously with respect to FIG. 4C.

Hence more generally the output image can be an image (e.g. a digital zoom of a still image) corresponding to the video image having the same time code, if the output image directly frames the first region. Alternatively, the output image can be a digital zoom out from the first region of the still image, to encompass one or more further regions of the still image (i.e. parts of the still image outside the first region) that do not correspond to a part of the video image, in a similar manner to that described previously with respect to FIG. 4C.

Notably, however, it is likely that the image within the first region of the still image is of a higher resolution than the corresponding video image. For example, if the overall resolution of the still image is 20 times higher than that of the video image, but the video camera's more narrow field of view means that it only captures one fifth of the view in the still image, then the corresponding first region of the still image nevertheless still has four times the resolution of the video image.

Therefore in an embodiment of the present image, the output image may be a digital zoom into the still image that frames a second region of the still image within the first region.

These operations can be instigated by a director or editor using the stored images. Hence in an example usage of a system according to an embodiment of the present invention, a video sequence stored in the image capture and processing unit is output (played back) up to a key point in time chosen by a director or editor, for which a still image (having the same time code) is also stored. The director or editor then commands the image capture and processing unit to switch to an equivalent region of the still image. The resulting digital zoom of the still image may be output a plurality of times in the same format and at the same frame rate as the reproduced video images, so that a continual video stream is available in which the video appears to 'freeze-frame' at the key point in time. The director or editor may then command the image capture and processing unit to zoom further into the still image (e.g. digitally zoom into successively smaller sub-regions of the still image within the first region) so as to generate a plurality of video frames that appear to zoom into the freeze-framed image in the output video stream, and/or command the image capture and processing unit to zoom out from the first region of the still image (e.g. digitally zoom into successively larger regions of the still image encompassing the first region of the still image) so as to generate a plurality of video frames that appear to zoom out from the freeze-framed image in the output video stream to reveal more of the surrounding scene. Similarly the director or editor may command the image capture and processing unit to pan within the still image at a same level of digital zoom, so generating successive video frames at the same apparent width of view as the video sequence, but which pan into other parts of the still image. Having performed such close-in, panning or wide-angle coverage of the key moment, the director or editor can then switch back to the stored video sequence at the next frame (or a frame/time of their choosing).

It will be appreciated that the video sequence and still images stored in the image capture and processing unit may be very recently stored; for example in the order of one video frame ago to a few seconds ago, and hence the output of the system may be a so-called 'buffered live' output.

In this case, the director or editor's command to the image capture and processing unit to switch to a still image may be relayed to the shutter release control unit as a triggering input, resulting in a synchronised still image being available for a video frame potentially one video frame after the request is made. In these circumstances the image capture and processing unit will continue outputting captured video images until the video frame with the requested corresponding still image is reached in the output sequence, and then execute the switch over.

Figure 8:
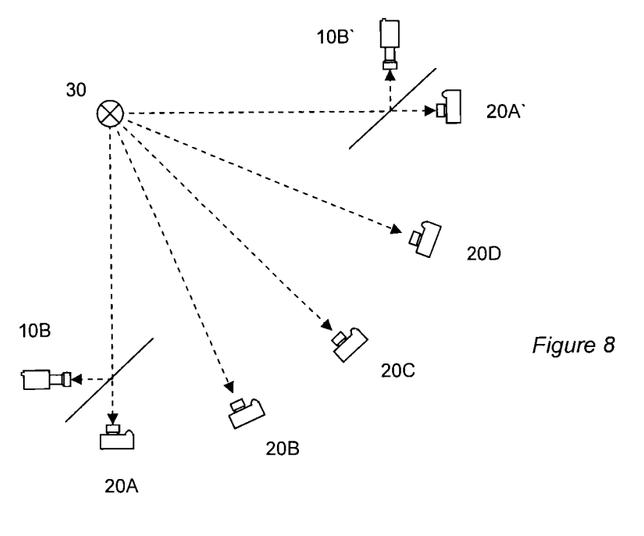
FIG. 8 is a schematic diagram of a video system in accordance with an embodiment of the present invention.

Turning now to FIG. 8, in an embodiment of the present invention a video system comprises the above combined still camera 20A and video camera 10B image processing system, and also comprises a second still camera 20A' and second video camera 10B' arranged as a pair in a similar manner to the previously described still camera 20A and video camera 10B. In this arrangement, the timing of video image capture by both the video cameras is commonly controlled by a reference signal from the reference signal source.

In addition, the video system comprises at least one further still camera 20B, 20C, 20D (FIG. 8 shows three such further still cameras for illustrative purposes), also coupled to the shutter release control unit, or equivalently coupled to a respective shutter release control unit receiving the same inputs as the shutter release control unit described previously. This at least one further still camera is arranged at substantially the same first width of viewing angle as the still cameras in the two still/video camera pairs.

Then, as shown in FIG. 8, the pair of the still camera and the video camera, the at least one additional still camera, and the pair of the second still camera and second video camera are located in a sequence as the pair of the still camera and the video camera, the or each additional still camera, and the pair of the second still camera and second video camera.

Typically they are each positioned and oriented to face a common point 30 in the scene that may be considered as an axis of rotation. As a non-limiting example on a soccer pitch, they may be oriented toward a centre-point of the penalty box.

The video cameras in each still/video camera pair capture video in synchrony by virtue of the reference signal (Gen-Lock signal). In addition, upon receiving a triggering input, the (or each) shutter release control unit causes each still camera to take a photograph at the next reference signal, such that a plurality of photographs is taken at the same time as the next video frame from each of the two video cameras.

This plurality of still images then represents a series of viewpoints in discrete steps from the viewpoint of the first video camera in the first video/still camera pair, around to the viewpoint of the second video camera in the second video/still camera pair, for a particular moment in time.

In an embodiment of the present invention, the image capture and processing unit is operable to generate interpolated images between the still images to provide a subjective continuous transition between the two video camera viewpoints, in an effect often referred to as a 'bullet time' view of a scene.

There are known techniques for generating such interpolated virtual viewpoints of a scene, such as so-called visual hull extraction, which attempts in effect to estimate a 3D model of the scene (for example as a voxel model) and then render that 3D model from a different viewpoint using the colours found in the available captured images. Alternatively or in addition other techniques may be possible based upon the stored geometry information of the scene as described previously, enabling the generation of intermediate images by, for example, warping captured images and repositioning image elements (such as players on a pitch) according to a modified viewpoint. Treating the photographs from adjacent still cameras as if they were a stereoscopic pair, yet further means to create intermediate images are possible from known parallax modification techniques. These techniques are not discussed in further detail herein.

It will be appreciated that if more cameras are distributed between the two still/video camera pairs, then either fewer interpolations have to be performed, or alternatively a slower pan between video camera viewpoints can be achieved for the same number of interpolations between pairs of still cameras.

In an example usage of a system according to an embodiment of the present invention, video sequences from the video cameras of both still/video camera pairs are stored in the image capture and processing unit. A video sequence from the first still/video camera pair (10B, 20A) stored in the image capture and processing unit is output (played back) up to a key point in time chosen by a director or editor. For this key point in time, there are also stored a plurality of still images (having the same time code) from the plurality of still cameras (for example the still cameras of the still/video camera pairs and the at least one additional still camera). The director or editor then commands the image capture and processing unit to begin a 'bullet time' pan through the still images. The image capture and processing units switches to an equivalent region of the first still image as described previously, and then proceeds to output a sequence of images including one or more interpolated images between successive corresponding regions of still images from each still camera. The corresponding regions in each still image may be calculated from knowledge of the relative physical position and orientation of each still camera with respect to the first still camera. The corresponding region of the still image from the still camera 10B' of the second still/video camera pair will correspond to the view from the video camera 20A' of the second still/video camera pair, enabling a switch to a video sequence from that video camera starting on or after the key point in time.

The resulting output is a video from a first viewpoint that then swings around to a second viewpoint during a fixed moment in time, before (optionally) continuing coverage from the second viewpoint. It can be appreciated that this would provide a dramatic way to review key moments in a game, such as when a player strikes a winning goal.

It will be appreciated further that whilst image interpolation provides the means to generate more interim viewpoints during the transition between video cameras, alternatively either more still cameras may be used, or the transition may be made very fast. Consequently interpolation may not be required during such a transition. Hence more generally in an embodiment of the present invention the video system is operable to generate a series of video images from the first video camera (of the first pair), generate an output image based upon the still image from the still camera of the still camera and video camera pair corresponding the last video image in the series of video images from the video camera, generate a output image based upon a still image from the or each additional still camera, generate an output image based upon the still image from the second still camera (of the second still camera and second video camera pair) corresponding to a first video image in a series of video images from the second video camera, and then generate a series of video images from the second video camera. Interpolation between still images may be performed if desired.

Figure 9:
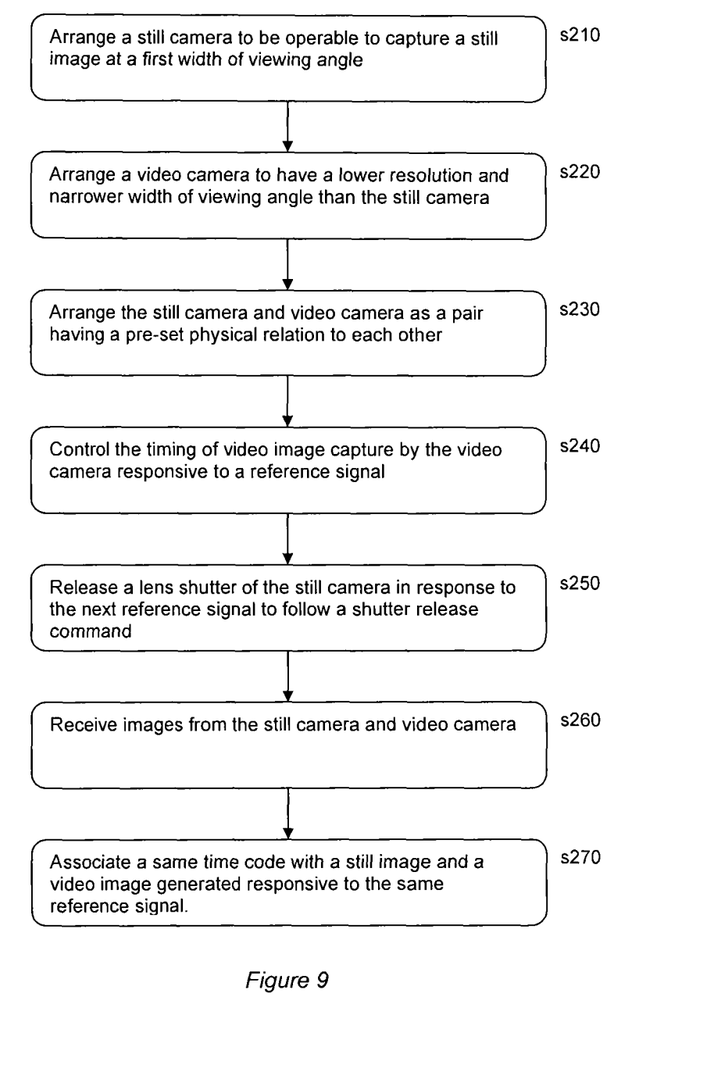
FIG. 9 is a flow chart for a method of image processing in accordance with an embodiment of the present invention.

Referring now to FIG. 9, a method of image processing comprises:
  in a first step s210, arranging a still camera operable to capture a still image with a first width of field of view;
  in a second step s220, arranging a video camera having a lower resolution than the still camera and operable to capture a video image at a second width of field of view narrower than that of the still camera;
  in a third step s230, arranging the still camera and video camera as a pair having a pre-set physical (i.e. positional) relation to each other;
  in a fourth step s240, controlling the timing of video image capture by the video camera responsive to a reference signal;
  in a fifth step s250, releasing a lens shutter of the still camera in response to the next reference signal to follow a shutter release command;
  in a sixth step s260, receiving images from the still camera and video camera; and
  in a seventh step s270, associating a same time code with a still image and a video image generated responsive to the same reference signal.

It will be apparent to a person skilled in the art that variations in the above method corresponding to operation of the various embodiments of the apparatus as described and claimed herein are considered within the scope of the present invention, including but not limited to:
  estimating a first region of a still image corresponding to at least part of a video image having the same time code, and generating an output image based upon the first region of the still image, the output image being for example a still image corresponding to the video image having the same time code, a digital zoom into the first region of the still image, or a digital zoom out from the first region of the still image, to encompass one or more further regions of the still image that do not correspond to a part of the video image; and positioning a second, similar video and still camera pair apart from the video and still camera pair, positioning one or more additional still cameras between the video and still camera pairs, storing video from the video cameras and still images from the still cameras, the still images sharing a same first time stamp with a single frame of video from each of the two video cameras, and generating an output image sequence comprising a series of video frames to from the video camera of the still and video camera pair ending at or immediately before the frame associated with the first time stamp, then comprising one or more output images based upon the or each still image from the or each additional still camera associated with the first time stamp, then a series of video frames from the video camera of the second still and video camera pair starting at or immediately after the frame associated with the first time stamp.

Finally, it will be appreciated that the methods disclosed herein may be carried out on conventional hardware suitably adapted as applicable by software instruction or by the inclusion or substitution of dedicated hardware. Thus the required adaptation to existing parts of a conventional equivalent device may be implemented in the form of a non-transitory computer program product or similar object of manufacture comprising processor implementable instructions stored on a data carrier such as a floppy disk, optical disk, hard disk, PROM, RAM, flash memory or any combination of these or other storage media that may be considered to be non-transitory machine readable signal bearing media tangibly encoded with a program, or similarly may be realised in hardware as an ASIC (application specific integrated circuit) or an FPGA (field programmable gate array) or other configurable circuit suitable to use in adapting the conventional equivalent device. Alternatively the program may be transmitted via data signals on a network such as an Ethernet, a wireless network, the Internet, or any combination of these or other networks.

Although illustrative embodiment of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. An image processing system, comprising:
a first video camera arranged to have a first width of field of view, and operable to capture a first image;
a second video camera arranged to have a second width of field of view narrower than that of the first video camera, and operable to capture a second image substantially at the same time that the first camera captures the first image; and
circuitry configured to access scene geometry for a known scene; and in which:
the first video camera and the second video camera are arranged in a pre-set positional relation to each other;
the circuitry is configured to map scene geometry onto the first image captured by the first video camera;
the circuitry is configured to store predetermined correction factors for relative optical distortions between the first image and the second image for a plurality of zoom levels of the second camera;
the circuitry is configured to map onto the second image captured by the second video camera at least part of the scene geometry mapped onto the first image, in dependence upon the pre-set positional relation of the first and second video cameras, their respective widths of field of view, and the predetermined correction factors; and
the circuitry is configured to graphically augment the second image based on the scene geometry mapped onto the second image to display the second image with additional information superposed on the second image.

2. An image processing system according to claim 1, wherein the pre-set positional relation between the first video camera and the second video camera positions them in alignment without lateral optical displacement.

3. An image processing system according to claim 2, wherein the first video camera and the second video camera are positioned orthogonally and optically aligned with the same point on either side of a two-way mirror positioned between them.

4. An image processing system according to claim 1, wherein the relative optical distortions include optical distortions arising from the difference in the width of field of view between the second video camera and the first video camera.

5. An image processing system according to claim 4, wherein the relative optical distortions further include relative optical distortions with reference to lens calibration data for the second video camera, the lens calibration data comprising one or more parametric descriptions of one or more optical properties of the second video camera for at least two widths of field of view.

6. An image processing system according to claim 1, wherein the position of a feature in the scene that is captured by the second video camera is tracked over time with reference to images from the first video camera.

7. An image processing system according to claim 1, wherein the first video camera has a lower image quality than the second video camera.

8. An image processing system according to claim 1, wherein the first video camera has at least the same image quality as the second video camera.

9. An image processing system according to claim 8, wherein the circuitry is configured to calculate a first region of the first image corresponding to at least part of the second image, and operable generate an output image comprising a digitally zoomed second region of the first image encompassing the first region.

10. A method of image processing comprising:
arranging a first video camera to have a first width of field of view;
arranging a second video camera to have a second width of field of view narrower than that of the first video camera;
arranging the first video camera and the second video camera in a pre-set positional relation to each other;
capturing a first image from the first video camera and a second image from the second video camera at substantially the same time;
mapping scene geometry onto the first image captured by the first video camera;
storing predetermined correction factors for relative optical distortions between the first image and the second image for a plurality of zoom levels of the second camera;
mapping onto the second image captured by the second video camera at least part of the scene geometry mapped onto the first image, in dependence upon the pre-set positional relation of the first and second video cameras, their respective widths of field of view, and the predetermined correction factors; and graphically augmenting the second image based on the scene geometry as mapped onto the second image to display the second image with additional information superposed on the second image.

11. A method of image processing according to claim 10, comprising:

tracking over time the position of a feature in the scene that is captured by the second video camera with reference to images from the first video camera.

12. A non-transitory computer-readable medium comprising computer readable instructions that, when executed by a computer, cause the computer to execute a method comprising:

capturing a first image from a first video camera and a second image from a second video camera at substantially the same time, the first image having a first width of field of view, the second image having a second width of field of view narrower than the first width of field of view, the first image and the second image being taken when the first video camera and the second video camera are in a pre-set positional relation to each other;

mapping scene geometry onto the first image captured by the first video camera;

storing predetermined correction factors for relative optical distortions between the first image and the second image for a plurality of zoom levels of the second camera;

mapping onto the second image captured by the second video camera at least part of the scene geometry mapped onto the first image, in dependence upon the pre-set positional relation of the first and second video cameras, their respective widths of field of view, and the predetermined correction factors; and graphically augmenting the second image based on the scene geometry as mapped onto the second image to display the second image with additional information superposed on the second image.

\* \* \* \* \*